United States Patent [19]
Mehta et al.

[11] Patent Number: 5,258,235
[45] Date of Patent: Nov. 2, 1993

[54] DECORATIVE LAMINATES HAVING TRANSLUCENT CORE SHEETS

[75] Inventors: Mahendra Mehta, Pittsfield; Richard D. Brownhill, Lee; William M. Stanard, Jr., Sheffield, all of Mass.

[73] Assignee: The Mead Corporation, Dayton, Ohio

[21] Appl. No.: 776,575

[22] Filed: Oct. 15, 1991

[51] Int. Cl.$^5$ .................. B32B 27/08; B32B 27/42
[52] U.S. Cl. ................................ 428/530; 428/531; 428/481; 428/535; 428/542.2; 428/220; 428/212; 428/913
[58] Field of Search ............. 428/531, 481, 535, 542.2

[56] References Cited
U.S. PATENT DOCUMENTS

| | | | |
|---|---|---|---|
| 4,263,373 | 4/1981 | McCaskey, Jr. et al. | 428/531 |
| 4,888,220 | 12/1989 | Mehta | 428/15 |
| 4,895,759 | 1/1990 | Crawford | 428/331 |
| 5,047,282 | 9/1991 | Mier | 428/204 |

Primary Examiner—George F. Lesmes
Assistant Examiner—Chris Raimund
Attorney, Agent, or Firm—Thompson, Hine and Flory

[57] ABSTRACT

Decorative laminates which provide a decorative effect similar to that of marble or synthetic marble are achieved by constructing the core from sheets having a very low opacity. These sheets are prepared from bleached Kraft pulp and do not contain titanium dioxide or other opacifying pigments. The core sheets are saturated with resins such as melamine formaldehyde, polyester or epoxy resin. These saturating resins approximately match the refractive index of the bleached Kraft pulp and provide a translucent effect. Core sheets may be assembled with conventional decor sheets and an abrasion-resistant overlay to provide decorative laminates. Due to the translucent nature of the core, the color of the decor sheets is shown throughout the thickness of the laminate. This results in a uniquely decorative edge.

13 Claims, No Drawings

DECORATIVE LAMINATES HAVING TRANSLUCENT CORE SHEETS

BACKGROUND OF THE INVENTION

This invention relates to a decorative laminate which provides a unique decorative effect. More specifically, the invention relates to a laminate which incorporates unpigmented bleached Kraft core sheets saturated with a resin which renders the core sheets translucent.

Decorative laminates are well-known in the art. They are commonly used in making table tops, desk tops, kitchen counters, interior and exterior wall panels, and other articles for residential, office or commercial use. Decorative laminates are characterized by their low cost, durability, impact and abrasion resistance, decorative clarity, resistance to heat and light, and resistance to mild chemicals.

Decorative laminates are typically constructed of a plurality of core sheets, one or more decor sheets, and optionally an overlay. Each of these sheets is impregnated with a resin, assembled into a book and consolidated or bonded together under high heat and pressure to provide a unitary structure.

The core sheets in conventional laminates are unbleached Kraft paper saturated with a phenolic resin. Conventionally, the core sheets are opaque and in many cases they are the brown color of unbleached Kraft. A decor sheet is normally placed on top of a book of the core sheets in order to hide the core and to provide a surface upon which decorative effects can be produced by printing and like techniques. In some cases, a decor sheet may also be placed on the bottom of the core sheet.

Recently, there has been an increasing demand for solid surfacing decorative materials and decorative laminates which mimic the decorative effect of marble or synthetic marble such as Corian (a trademark of E. I. DuPont deNemours Company) as provided interesting effects in decorative laminates. One response to this need has been the decorative laminates described in commonly assigned U.S. Pat. No. 4,888,220 which discloses a laminate formed from a decor sheet comprising bleached cellulose fibers, titanium dioxide and/or a pearl pigment.

SUMMARY OF THE INVENTION

It has now been found that decorative laminates which provide a decorative effect similar to that of marble or synthetic marble can be achieved by constructing the core from sheets having a very low opacity. These sheets are prepared from bleached Kraft pulp and do not contain titanium dioxide or other opacifying pigments. The core sheets are saturated with resins such as melamine formaldehyde, polyester or epoxy resin. These saturating resins approximately match the refractive index of the bleached Kraft pulp and provide a translucent effect.

Core sheets in accordance with the invention can be assembled with conventional decor sheets and an abrasion-resistant overlay to provide decorative laminates. Due to the translucent nature of the core the color of the decor sheets is shown throughout the thickness of the laminate. This results in a uniquely decorative edge.

DETAILED DESCRIPTION

Core sheets in accordance with the invention are prepared from bleached Kraft pulp. The pulp may consist of hardwood, softwood, and mixtures thereof. High alpha cellulose pulp can be added to enhance post-forming properties. The core sheets are formed in a conventional manner. Any conventional bleaching process may be used to bleach the pulp including chlorine and chlorine dioxide bleaching processes. The pulp is preferably bleached to a brightness greater than 80% and typically about 88 to 95%.

The core sheets are saturated with a laminating resin which is capable of imparting a translucent effect to the core. Such resins when cured have a refractive index of about 1.5 to 1.6 which approximately matches the refractive index of bleached Kraft which is typically 1.55. Examples of such resins include melamine-formaldehyde resin, polyester resin, and epoxy resins. These laminating resins saturate the core sheet and are used in a conventional amount.

It is critical that the core sheets do not contain titanium dioxide, pearl pigment, or other opacifying pigment. The core sheets may be free of any filler, although fillers having a refractive index which is approximately equal to that of the laminating resin or bleached fibers can be used. Such fillers include clay, talc, silica, and flame-retardant fillers such as aluminum trihydrate (ATH). These fillers can be present in an amount of about 0 to 300% based on the amount of fiber.

Additives such as alum, alkali, retention aids, wet strength resins, etc. may also be added to the core furnish to control formation, retention and other physical properties in a known manner.

Because the core is translucent, it is no longer necessary to hide the core. Consequently, decor sheets can be placed at any location within the laminate, thereby increasing the number of design possibilities. Because the core is translucent, diffused transmission of light occurs within the decorative laminate and the core sheets transmit the color of the decor sheets within the laminate.

A decor sheet is placed on the top and bottom of the laminate, thereby, sandwiching the core sheets between a pair of decor sheets. Decor sheets may also be incorporated or interleaved among the core sheets in any manner desired. Typically, a laminate will contain a book of approximately 1 to 12 core sheets and one or two decor sheets may be incorporated within this book of core sheets together with a top and the bottom decor sheets.

The core sheets in accordance with the present invention preferably have a basis weight of 30 to 200 pounds per 3,000 square feet and preferably 70 to 150 pounds per 3,000 square feet.

The decor sheet used in the invention is typically a sheet of high quality cellulose fiber and fillers impregnated with a thermosetting condensation resin such as melamine-formaldehyde, polyester or epoxy resins. The decor sheet is preferably a solid uniform color. Optionally it may be printed with a pattern depending upon the decorative effect which is desired. The decor sheet may contain opacifying pigments including titanium dioxide. Additionally, the decor sheet may contain strengthening aids and formation and retention aids all of which are known in the art and some of which have been previously mentioned with respect to the core sheets. The decor sheet may range from about 10 to 100 pounds or more per 3,000 square feet. A preferred range is 30 to 100 pounds per 3,000 square feet. As previously indicated, decor sheets are known in the art and can be prepared in a conventional manner. One method for preparing the decor sheets is described in U.S. Pat. No. 3,135,643.

The laminate will usually include a protective overlay sheet to provide better abrasion resistance and good surface appearance. Overlay sheets are well-known in the art. Examples of overlay sheets can be found in Canadian Patent 990,632 and U.S. Pat. Nos. 3,135,643; 3,445,327; 3,525,664; 3,798,117; and 3,975,572. Overlay sheets usually contain mineral particles such as silica, alumina, titanium oxide, tin oxide, zirconium oxide and the like. The overlay may be formed from alpha cellulose fibers and have a basis weight ranging from approximately 12 to 35 pounds per 3,000 square feet. Also useful is a high bleached Kraft pulp or alpha pulp beaten to a Canadian standard freeness of about 500 ml.

High pressure laminating techniques can be employed in preparing laminates from the above-described sheets. Temperatures ranging from about 120–180 degrees C. and pressures ranging from about 250 to 1500 PSI are normally employed. Depending upon the resin system, the lamination cycle may range from about 3 to 300 minutes.

Decorative laminates in accordance with the invention can range in thickness from about 1/16 to about ¾ inch.

The invention will illustrate in more detail by the following non-limiting example:

EXAMPLE

Six sheets of core stock at 130 lb/3000 ft$^2$ and containing 85% bleached hardwood pulp and 15% bleached softwood pulp are treated with melamine formaldehyde resin to a resin content of 55%. On the top and bottom of this stack of core sheets are placed decor sheets at 65 lb./3000 ft$^2$ with the same pulp combination plus 50% TiO$^2$ based on the pulp weight, and the same resin content as the core sheets. Over the top decor sheet is placed a 20 lb./3000 ft$^2$ overlay containing 85% bleached softwood and 15% bleached hardwood pulps and treated with 65% melamine formaldehyde resin. All resin has been B staged to 5–7% volatiles. The total stack is then laminated at 300° F. and 1000 psi for 8 min. and then cooled to 100° F. The resulting laminate appears to have the same blue white color of the decor sheets throughout the entire thickness of the laminate.

Having described the invention in detail and by reference to preferred embodiments thereof, it will be apparent that modifications and variations are possible without departing from the scope of the invention defined in the appended claims.

What is claimed is:

1. A solid color decorative laminate having a unique decorative effect at its edge consisting essentially of top and bottom decor sheets, said top and said bottom decor sheets being opaque and a solid color, and a plurality of translucent core sheets free of opacifying pigments interposed between said top and said bottom decor sheets, said core sheets being formed from bleached Kraft pulp fibers and being impregnated with a laminating resin and consolidated with said decor sheets under heat and pressure to form said laminate, said laminating resin when cured having a refractive index sufficiently approximating the refractive index of said pulp fibers to render said core sheets translucent such that the color of said decor sheets is visibly transmitted throughout the thickness of said core sheets when said laminate is viewed from the edge.

2. The decorative laminate of claim 1 wherein said core sheets have a basis weight of about 30 to 200 pounds per 3,000 square feet.

3. The decorative laminate of claim 2 wherein said pulp fibers are hardwood, softwood, or mixtures thereof.

4. The decorative laminate of claim 1 wherein said core sheets include one or more fillers having a refractive index approximately the same as said laminating resin when cured.

5. The decorative laminate of claim 1 wherein said decorative laminate additionally includes one or more decor sheets interleaved among said plurality of said core sheets.

6. The decorative laminate of claim 1 wherein said laminate additionally includes an abrasion-resistant overlay sheet.

7. The decorative laminate of claim 1 wherein said core sheet is free from titanium dioxide.

8. The decorative laminate of claim 4 wherein said core sheets contain up to about 300% of said one or more fillers having a refractive index approximately the same as said laminating resin when cured.

9. The decorative laminate of claim 1 wherein said laminating resin when cured has a refractive index of about 1.5 to 1.6.

10. The decorative laminate of claim 9 wherein said laminating resin is a melamine-formaldehyde resin.

11. The decorative laminate of claim 1 wherein said decorative laminate has a thickness of about 1/16 to ¾ inch.

12. The decorative laminate of claim 1 wherein said bleached Kraft pulp fibers have a brightness greater than about 80%.

13. The decorative laminate of claim 12 wherein said brightness is about 88 to 95%.

* * * * *